Figure 1:
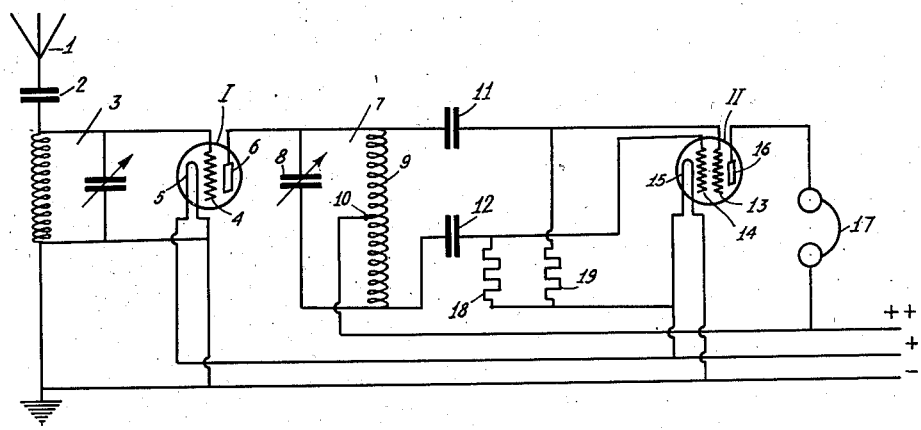

Jan. 8, 1935.    K. POSTHUMUS    1,986,851
DETECTOR CIRCUIT
Filed May 31, 1930    2 Sheets-Sheet 1

INVENTOR
KLAAS POSTHUMUS
BY
ATTORNEY

Patented Jan. 8, 1935

1,986,851

UNITED STATES PATENT OFFICE 1,986,851

DETECTOR CIRCUIT

Klaas Posthumus, Eindhoven, Netherlands, assignor to Radio Corporation of America, a corporation of Delaware Application May 31, 1930, Serial No. 458,328
In the Netherlands June 20, 1929

20 Claims. (Cl. 250—27)

The present invention relates to detection of high frequency oscillations, more particularly to the so-called grid detection.

As is well known, the control electrode of the detector is connected, for grid detection, through a comparatively small capacity to the source of the high frequency oscillations. This, as well as the uni-directional conductivity of the grid-filament path, results in the average potential of the grid falling at each high frequency wave train, owing to the fact that electrons accumulate on the grid, the electrons being allowed to leak away through the leakage paths that are present (insufficient insulation), or through a leakage resistance which has been provided. Such fluctuations of the average grid potential obviously involve variations of the anode current, which consequently occur in the (audible) rhythm of the wave trains, and can be observed in the receiver.

This method of detection has the advantage of being extremely sensitive and therefore it is almost commonly applied, in contradistinction to anode detection which is only of practical use when the amplitudes of the incoming high frequency oscillations have rather considerable values, or have been raised to such values. The grid detection described has, however, the drawback, that the fluctuations of the anode current are only within certain limits proportional to the amplitude variations of the incoming high frequency oscillations, said proportionality being, of course, in general desirable. In fact, with great amplitudes of the high frequency grid oscillations, the average grid potential falls to such an extent that the tube begins to work in the lower bent portion of its characteristic curve, which means that the average anode current no longer corresponds to the value, which, as may be read off from the static characteristic curve, pertains to the said low grid-potential, but obtains a higher value in consequence of the occurring anode-detection.

In this case, the latter, consequently, counteracts the grid-detection, breaks the above mentioned proportionality, and, in the case of very strong incoming signals, it may even tend to inverse said proportion; that is to say, the reception becomes weaker at an increasing amplitude of the received high frequency oscillations.

If, therefore, a receiving set adapted for the reception of weak signals and therefore working with grid detection, approaches a strong transmitting station, the peculiar, but undesirable phenomenon occurs that this transmitting station can only be properly received if the apparatus is detuned either to one or to the other side. In fact, if the set is tuned to resonance, the amplitude of the oscillations on the grid of the detector becomes so large, that the grid-detection is practically entirely spoiled by the simultaneously occurring anode detection.

The invention relates to a circuit arrangement for grid-detection, in which the above mentioned drawback is avoided, and which is based on the following novel principle:

If a detector tube does not comprise one, but two, or more, control electrodes, the latter may be connected to an equally large number of points of a circuit arrangement in which high frequency oscillations occur. In so far as this connection is established through a grid condenser, said grids will act, due to the grid detection, on the average anode current in the same sense and independently of any possible phase difference between the said points. The question of the phase in which the various grids are oscillating is, however, of primary importance for the anode detection which may simultaneously occur. By an adequate choice of the points of the circuit arrangement to which the grids are connected, it is possible to create such a phase difference between these grids that as far as anode detection is concerned they will at any instant mutually neutralize their action either entirely or substantially.

The simplest case is that in which there are two control grids between which a phase difference of 180° or thereabout is maintained. If in this case both grids are lying in one plane, or if, generally speaking, their amplification factor (or their "Durchgriff") is the same, the amplitudes of the high frequency oscillations to be impressed upon these grids will at any instant have to be mutually equal in absolute value. At different amplification factors a correspondingly different relation between the oscillation amplitudes to be impressed upon the grids must be chosen. In the case of three grids they should be connected to points between which exist phase differences of 120°, and so on.

The novel features which I believe to be characteristic of my invention are set forth in particularity in the appended claims, the invention itself, however, as to both its organization and method of operation will best be understood by reference to the following description taken in connection with the drawings in which I have indicated diagrammatically several circuit organizations whereby my invention may be carried into effect.

Figure 2:
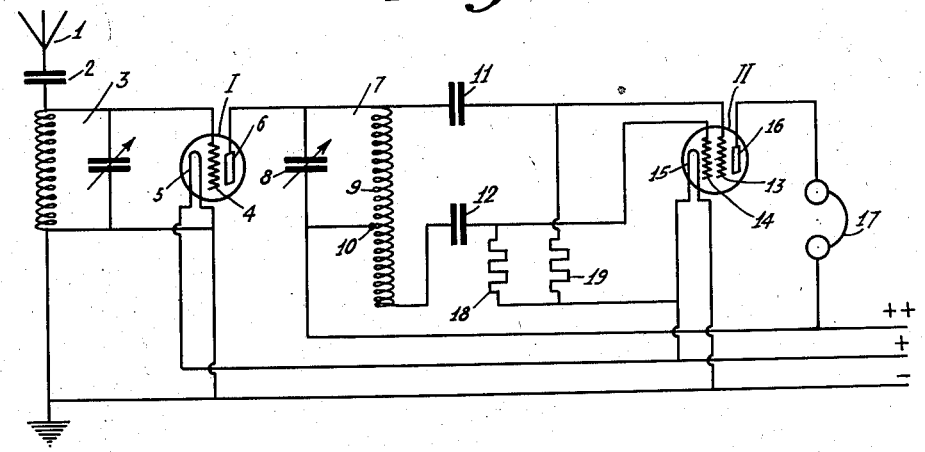
Figure 3:
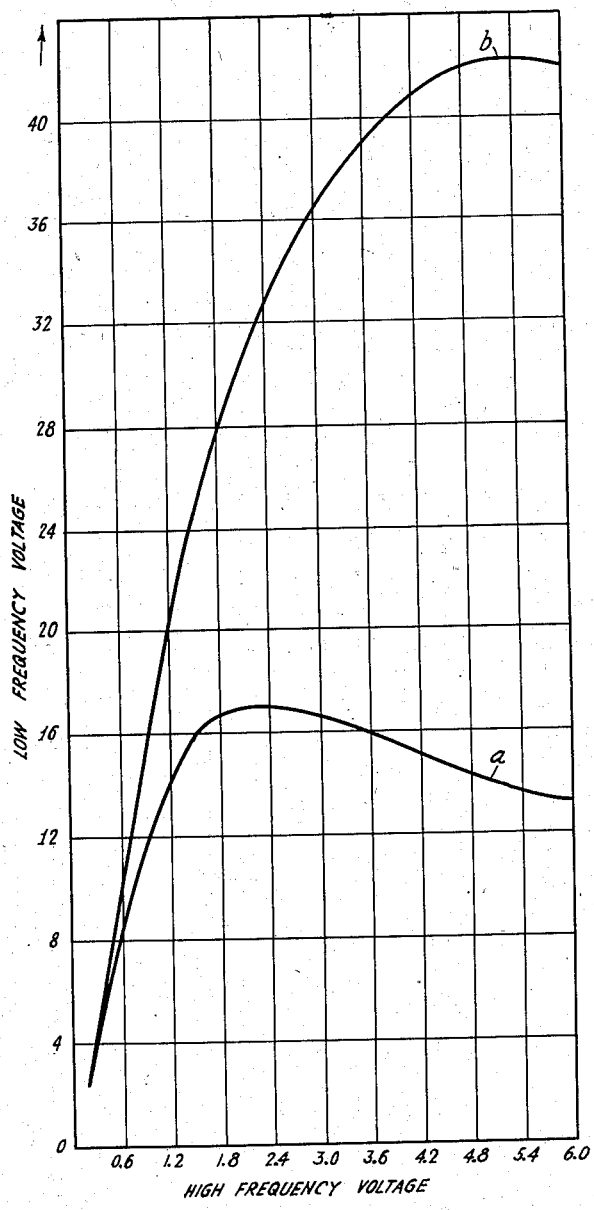

The invention will be more clearly understood by referring to the accompanying drawings in which Figs. 1 and 2 represent by way of example, two embodiments of the invention, Fig. 3 shows a graphic comparison between the results obtained by the new and by the old circuit arrangements for grid detection.

Referring to Fig. 1, the high frequency oscillations received by a grounded antenna 1, are fed by a series condenser 2 to a tunable input circuit 3 of a high frequency amplifier tube I. This tube comprises a control grid 4, a cathode 5 and an anode 6, the latter being connected to one end of a second tunable circuit 7. This circuit comprises a variable condenser 8, connected in parallel to a coil 9 which has an intermediate tapping point 10.

The end of the circuit 7, which is connected to the anode 6, is also connected by a grid condenser 11 to a grid 13 of a detector tube II, while the other end of the coil 9 is connected, through a second grid condenser 12, to a second grid 14 of this detector. Furthermore, the tap 10 of the coil 9 is connected to the positive terminal of a source supplying the anode current. In addition, the detector tube comprises a cathode 15 and an anode 16, the latter being connected by a telephone 17, or loud speaker, to the said positive terminal. Finally, the two grids 13 and 14 are connected to the cathode 15 by leakage resistances 18 and 19 respectively.

The operation of the circuit is as follows:

After being amplified by the tube I, the amplified oscillations reach the circuit 7, and produce high frequency voltage variations across the ends of the coil 9, between which there will be a phase difference of 180°. Assuming that the point 10 lies in the middle of the coil 9, the amplitudes of the oscillations in the said ends will be mutually equal in absolute value.

These oscillations are transferred through the condensers 11 and 12 to the grids 13 and 14 respectively whose average potentials, at the passage of a wave train, fall to an equal extent, so that as to the grid detection they mutually support their operation. On the contrary, the high frequency variations, to which both grid potentials are continuously subject during the passage of a wave train, will have no effect on the intensity of the anode current, because for the one grid they are at any instant equal but opposite to those of the other anode, the undesired grid detection being in this case entirely suppressed.

It should be observed that in case of an ideal compensation obtained by the use of inversely working grids, no high frequency currents at all will circulate in the anode circuit of the detector, so that it is no longer of any use to couple this circuit back to the grid circuit. In this case, the usual telephone, or by-pass condenser connected in parallel to the reproducer 17, may also be dispensed with, since the circulation of high frequency currents in the low frequency part of the circuit arrangement is already sufficiently prevented on account of the said compensation.

A complete compensation may be approximated as much as possible by arranging the grids 13 and 14 in one plane and by causing the rods of these grids to alternate. There is no objection, however, to arrange the grids in different planes, provided this arrangement is taken into account when selecting the position of the point 10. A drawback of the circuit arrangement according to Fig. 1 consists in that both electrodes of the variable condenser 8 oscillate, owing to which the so-called "hand effect" might cause trouble.

In order to avoid this, the arrangement may be such as is represented in Fig. 2 which differs from Fig. 1 only as to the circuit 7, for in Fig. 2 the condenser 8 is not inserted between both ends of the coil 9, but between the anode end of this coil, and the point 10 which does not oscillate, the tuning of the circuit 7 being thus simplified.

Fig. 3 shows two curves (a) and (b), which represent the low frequency alternating tension in volts occurring at the reproducer 17, as a function of the amplitude of the high frequency grid oscillations in volts, viz, for normal grid detection and for multiple compensated grid detection, according to the invention, respectively.

For plotting the curve (b) use has been made of a detector tube comprising two grids lying in one plane and provided each with a grid condenser. The advantage obtained by the invention clearly appears from this graph. At low values of the high frequency grid oscillations, up to about 1 volt, the difference between both methods of detection is only slight, but even at 3 volts a difference of more than 100% in favour of the new method becomes manifest.

It consequently appears that the high frequency load of the detector can be considerably raised, which, as mentioned at the outset, affords a great advantage in the neighborhood of strong transmitting stations, and which, in addition will always prove to be very useful to receiving transmitting stations having a low modulation depth. Furthermore, the possibility of coupling one low frequency amplifier valve of rather high power directly behind the detector and of applying nevertheless the full load to this valve, may be considered a general advantage.

For the principle of the invention it is immaterial whether the detector is preceded by one, two or more high frequency amplification stages or is fed directly from the aerial. Besides, it is not necessary to connect all the grids of the detector valve to a grid condenser, though it is advisable to do so in view of the sensitiveness and of the symmetry desirable for the compensation of the anode detection.

It is to be understood that the expression "electron path" which occurs in certain of the following claims, refers to the electron stream, or path, which exists between the cathode and anode in the absence of grids. This term is not intended to take into account any effect of the grids in breaking up the electron path into smaller paths.

While I have indicated and described several systems for carrying my invention into effect, it will be apparent to one skilled in the art that my invention is by no means limited to the particular organizations shown and described, but that many modifications may be made without departing from the scope of my invention as set forth in the appended claims.

What I claim is:

1. A detector circuit arrangement comprising a detector tube of the type including only a single anode and at least two grids arranged for grid circuit rectification, an input circuit including an inductance coil, each grid being connected to an oscillating end of the coil, an intermediate non-oscillating point of the coil being connected by a tuning condenser to one of the said oscillating ends.

2. A method of operating an electron discharge tube provided with a cathode, a single anode, and at least two grids disposed in the same electron path between the cathode and anode and arranged for grid rectification, each grid affecting substantially the entire electron path, as a detector of signal modulated radio frequency energy of relatively high intensity, which consists in collecting said signal energy, amplifying the collected energy to said intensity, impressing the amplified energy upon one of the grids, and simultaneously impressing a radio frequency voltage of signal frequency on the other grid of such a magnitude and phase as to substantially neutralize the effect of the signal frequency variation on the said electron path.

3. A method of operating an electron discharge tube, provided with a cathode, anode, and at least two grids disposed in the same electron path between the cathode and anode and arranged for grid rectification, each grid affecting substantially the entire electron path, which consists in impressing signal modulated radio frequency energy of relatively high intensity upon a grid of the tube, simultaneously impressing similar energy upon the other grid, and adjusting the phase of the energy applied to the second grid so as to substantially neutralize the effect of the signal frequency variation on said electron path.

4. A method of operating an electron discharge tube, provided with a cathode, anode, and at least two grids disposed in the same electron path between the cathode and anode and arranged for grid rectification, each grid affecting substantially the entire electron path, which consists in impressing signal modulated radio frequency energy of relatively high intensity upon a grid of the tube, simultaneously impressing similar energy upon the other grid, and adjusting the phase of the energy applied to the second grid so as to substantially neutralize the effect of the signal frequency variation on said electron path and directly employing the anode current of the tube for rendering said signals audible.

5. A detector circuit comprising an electron discharge tube including a single anode, a cathode and at least two grids, said tube being provided with a resonant input circuit including an inductance coil, the grids being connected to opposite ends of said coil, said grids being co-planarly arranged, and means in at least one of said grid circuits to permit said circuit to detect by grid rectification.

6. In combination, a source of desired radio frequency signals, a detector circuit comprising an electron discharge tube having a single anode, a pair of grids and a cathode and being provided with a resonant input circuit including an inductance coil, said grids being co-planarly arranged, means for connecting a grid of the tube to one end of said coil, said connecting means including a capacity, and additional means including a capacity between the other end of said coil and the other grid, for substantially diminishing the radio frequency component of anode current in the output circuit of said tube, and a resistor connected from each grid, adjacent its said capacity, and said cathode.

7. The method of operating a detector tube, which tube has a pair of grids arranged for grid rectification and disposed in the same electron stream between the cathode and anode of the tube, each grid affecting substantially the entire electron stream, with a substantially linear characteristic relating high frequency input and rectified output voltages over a wide range of said high frequency input voltages, which method includes the step of impressing in phase opposition upon said grids signal energy to be rectified, and controlling the effect of said grids on the space current of the tube in such a manner that the radio frequency component of anode current is greatly reduced.

8. In combination, in a detector stage, a tube provided with a cathode, a single anode, a single electron stream between said cathode and anode, and a pair of control grids disposed in the said electron stream, each grid affecting substantially the entire electron path, a resonant signal input circuit including a coil, said grids being connected to the opposite ends of said coil whereby signal energy is impressed on said grids with a phase difference of 180 degrees, a connection between an intermediate point of said coil and a point in the cathode to plate circuit of said tube, said grids being so relatively arranged that they have substantially equal and opposite radio frequency effects on the tube space current, and grid circuit rectification means connected to each grid.

9. In combination, in a detector stage, a tube provided with a cathode, a single anode, and a pair of co-planar control grids, a resonant signal input circuit including a coil, said grids being connected to the opposite ends of said coil whereby signal energy is impressed on said grids with a phase difference of 180 degrees, a connection between an intermediate point of said coil and a point in the cathode to plate circuit of said tube, and grid circuit rectification means connected to each grid.

10. In combination, in a detector stage, a tube provided with a cathode, a single anode, and a pair of co-planar control grids, a resonant signal input circuit including a coil, said grids being connected to the opposite ends of said coil whereby signal energy is impressed on said grids with a phase difference of 180 degrees, a connection between the mid-point of said coil and a point in the cathode to plate circuit of said tube, and grid circuit rectification means connected to each grid.

11. In combination, in a detector stage, a tube provided with a cathode, a single anode, and a pair of co-planar control grids, a resonant signal input circuit including a coil, said grids being connected to the opposite ends of said coil whereby signal energy is impressed on said grids with a phase difference of 180 degrees, a connection between an intermediate point of said coil and a point in the cathode to plate circuit of said tube, grid circuit rectification means connected to at least one grid, and at least one stage of signal energy amplification connected to said resonant input circuit.

12. In combination, in a detector stage, a tube provided with a cathode, a single anode, and a pair of control grids, a resonant signal input circuit including a coil, said grids being connected to the opposite ends of said coil whereby signal energy is impressed on said grids with a phase difference of 180 degrees, a connection between an intermediate point of said coil and a point in the cathode to plate circuit of said tube, grid circuit rectification means connected to each grid and a variable tuning condenser connected between the said intermediate point of said coil and the high potential end of the coil.

13. A method of employing an electron discharge tube, provided with a cathode electrode, a single anode electrode, and a grid electrode and at least one auxiliary electrode, both disposed in the same space current path between the cathode and anode, said grid and auxiliary electrodes each affecting substantially the entire space current path, as a grid detector of signal modulated radio frequency energy of relatively high intensity, which consists in collecting the signal energy, amplifying the collected energy to said intensity, impressing the amplified energy upon the grid electrode of the tube, and simultaneously producing a radio frequency voltage at said auxiliary electrode of such magnitude and phase as to substantially neutralize the effect of the signal frequency variation on said space current.

14. A method of grid detection of signal modulated radio frequency energy of relatively high intensity with an electron discharge provided with a cathode, a single anode, and a control electrode and one or more auxiliary electrodes both disposed in the same space current path between the cathode and anode, said control and auxiliary electrodes each affecting substantially the entire space current path, which consists in collecting the signal energy, amplifying the collected energy to said intensity, impressing the amplified energy upon the control electrode of the device, and simultaneously impressing a radio frequency voltage, upon at least one of said auxiliary electrodes, of such a magnitude and phase as to substantially neutralize the effect of the signal frequency variation on said space current.

15. In a high frequency system, a network including a tube provided with a cathode, an output anode, and at least two auxiliary cold electrodes disposed in the same electron path between the cathode and anode, each of said cold electrodes affecting substantially the entire electron path, a resonant high frequency input circuit comprising a coil and condenser, said auxiliary electrodes being connected to different potential points on said coil, means in the said input circuit for rendering the latter and said auxiliary electrodes operative as a grid rectification circuit, an output circuit connected between the anode and cathode, said potential points being of opposing phase and of substantially equal potential magnitude whereby the high frequency component of rectified current in the output circuit is substantially suppressed.

16. In combination with a source of high frequency signal energy whose intensity varies over a range having an upper limit of the order of six volts, a rectifier network of the grid rectification type, adapted to rectify said energy over substantially the whole of said range in a substantially linear manner, said network including a tube provided with a cathode, an output electrode, and at least two auxiliary cold electrodes disposed in the same electron path between the cathode and output electrode, each of said cold electrodes affecting substantially the entire electron path, a signal input circuit connected to said source, a low frequency output circuit connected between the output electrode and cathode, connections from said auxiliary electrodes to points on said input circuit, said points being of such relative signal potential phase and magnitude that anode rectification over said range is prevented.

17. A signal detector network comprising, in combination, an electron discharge tube including a cathode and anode between which there exists a single electron path, a signal input circuit, at least two grids in said path, each grid affecting substantially the entire electron path, connections between said input circuit and said grids whereby a negative potential is created in the path proportional to the strength of the signals, said connections being made to such radio frequency potential points on the input circuit that signal potentials are impressed on said path in opposing phase.

18. A signal detector network comprising, in combination, an electron discharge tube including a cathode and anode between which there exists a single electron path, a signal input circuit, a pair of co-planarly arranged grids in said path, connections between said input circuit and said grids whereby a negative potential is created in the path proportional to the strength of the signals, said connections being made to such radio frequency potential points on the input circuit that signal potentials are impressed on said path in opposing phase.

19. A detector comprising a tube which includes a cathode and anode between which there exists a single electron path, an input circuit, a plurality of means each affecting substantially the entire electron path connected between said input circuit and said path creating a negative potential field in the path whose intensity is proportional to the strength of received modulated signal energy, the connections to the input circuit being to different signal potential points thereon, said points being chosen in such a manner that signal potentials are impressed on the electron path in opposing phase.

20. A detector comprising a tube which includes a cathode and anode between which there exists a single electron path, an input circuit, a plurality of means, each affecting substantially the entire electron path connected, between said input circuit and said path creating a potential field in the path whose intensity is proportional to the strength of received modulated signal energy, the connections to the input circuit being chosen in such a manner that signal potentials are impressed on the electron path in opposing phase.

KLAAS POSTHUMUS.